US008667060B2

(12) United States Patent
Van Olst et al.

(10) Patent No.: US 8,667,060 B2
(45) Date of Patent: Mar. 4, 2014

(54) DATA COLLECTION FROM UTILITY METERS OVER ADVANCED METERING INFRASTRUCTURE

(75) Inventors: Terry Lee Van Olst, Coal Center, PA (US); Ajay Hanumantrao Koliwad, Oreland, PA (US)

(73) Assignee: General Electric Company, Schenectady, NY (US)

(*) Notice: Subject to any disclaimer, the term of this patent is extended or adjusted under 35 U.S.C. 154(b) by 503 days.

(21) Appl. No.: 12/952,490

(22) Filed: Nov. 23, 2010

(65) Prior Publication Data

US 2012/0131100 A1    May 24, 2012

(51) Int. Cl.
G06F 15/16    (2006.01)

(52) U.S. Cl.
USPC ................ 709/204; 702/62; 340/870.02

(58) Field of Classification Search
USPC ......... 709/224, 204, 201, 203, 206, 253, 200; 702/61, 62, 188; 340/870.02; 705/63
See application file for complete search history.

(56) References Cited

U.S. PATENT DOCUMENTS

| | | | | |
|---|---|---|---|---|
| 6,118,269 | A * | 9/2000 | Davis ........................... | 324/110 |
| 6,741,856 | B2 * | 5/2004 | McKenna et al. ........... | 455/422.1 |
| 7,171,374 | B1 * | 1/2007 | Sheehan et al. .............. | 705/7.25 |
| 7,417,557 | B2 * | 8/2008 | Osterloh et al. ......... | 340/870.03 |
| 2002/0120569 | A1 * | 8/2002 | Day ................. | 705/40 |
| 2005/0033534 | A1 | 2/2005 | Villicana et al. | |
| 2006/0227006 | A1 * | 10/2006 | Gould et al. ............. | 340/870.02 |
| 2007/0211768 | A1 * | 9/2007 | Cornwall et al. ............. | 370/509 |
| 2008/0040342 | A1 * | 2/2008 | Hust et al. ......................... | 707/5 |
| 2008/0109537 | A1 * | 5/2008 | Aune et al. .................... | 709/220 |
| 2008/0177678 | A1 * | 7/2008 | Di Martini et al. ........... | 705/412 |
| 2009/0138617 | A1 * | 5/2009 | Veillette ........................ | 709/238 |
| 2009/0247146 | A1 * | 10/2009 | Wesby .......................... | 455/419 |
| 2011/0047052 | A1 * | 2/2011 | Cornish .......................... | 705/30 |
| 2012/0030358 | A1 * | 2/2012 | MacKenzie ................... | 709/226 |

OTHER PUBLICATIONS

National Energy Technology Laboratory, "A Vision for the Smart Grid: The Modern Grid Strategy",Jun. 2009, 11 pages.
National Energy Technology Laboratory, "Integrated Communications: Appendix B1: A Systems View of the Modern Grid", Feb. 2007, 19 pages.
National Energy Technology Laboratory, "Advanced Metering Infrastructure: NETL Modern Grid Strategy Powering our 21st-Century Economy", Feb. 2008, 31 pages.
Frost & Sullivan, "Open Standards, Open Possibilities: Addressing Reliablity Through Next Generation Utility Information and Control Systems", Jun. 2006, 8 pages.
New Zealand Office Action issued in connection with NZ Patent Application No. 596373, Nov. 15, 2011.

* cited by examiner

*Primary Examiner* — Kostas Katsikis
(74) *Attorney, Agent, or Firm* — William Heinze; Hoffman Warnick LLC

(57) ABSTRACT

Communicating data via an advanced metering infrastructure (AMI). An infrastructure is disclosed that includes: a plurality of communication modules incorporated into a plurality of associated utility meters; a data aggregator configured for communicating with each of the plurality of communication modules, wherein the data aggregator includes a system for translating meter specific data formats into an aggregated format that includes data quality attributes and a timestamp, and includes a system for synchronizing aggregated data over a back haul; and a head end system having a communication management system that receives and processes synchronization messages from the data aggregator received over the back haul, wherein the head end system includes a metering system for requesting and obtaining meter data from the associated utility meters via the data aggregator, and issuing signals to individual meters and groups of meters.

20 Claims, 4 Drawing Sheets

DATA COLLECTION FROM UTILITY METERS OVER ADVANCED METERING INFRASTRUCTURE

BACKGROUND OF THE INVENTION

The present invention relates generally to data collection from utility meters, and more particularly to data collection from meters over an Advanced Metering Infrastructure (AMI).

Advanced Metering Infrastructure (AMI) refers to systems that measure, collect and analyze energy usage, and interact with advanced devices such as electricity meters, gas meters, heat meters, and water meters, through various communication media either on request (on-demand) or on pre-defined schedules. This infrastructure includes hardware, software, communications, consumer energy displays and controllers, customer associated systems, Meter Data Management (MDM) software, supplier and network distribution business systems, etc.

The network between the measurement devices and business systems allows collection and distribution of information to customers, suppliers, utility companies and service providers. This enables these businesses to either participate in, or provide, demand response solutions, products and services.

BRIEF DESCRIPTION OF THE INVENTION

In one aspect of the present invention, a data aggregator for use in an advanced metering infrastructure (AMI) is provided, comprising: a communication system for communicating with a plurality of communication modules resident in a plurality of associated utility meters; a data collection system for collecting messages from the plurality of communication modules; an aggregation system for managing messages as aggregated data in an addressable memory space; a back haul interface for communicating via a back haul to a head end system; and a data presentation system for transmitting aggregated data to a head end system via the back haul such that the head end system is synchronously updated with changes in data from the data aggregator.

In a further aspect, a communication card for use with an associated utility meter in an advanced metering infrastructure (AMI) is provided, comprising: a meter interface for communicating with the associated utility meter; a communication interface for communicating data with a data aggregator; and a message processing system for managing inbound and outbound spontaneous messages, including transmitting event data relating to charging a plug-in hybrid electric vehicle (PHEV).

In still a further aspect, advanced metering infrastructure (AMI) is provided, comprising: a plurality of communication modules incorporated into a plurality of associated utility meters; a data aggregator configured for communicating with each of the plurality of communication modules, wherein the data aggregator includes a system for translating meter specific data formats into an aggregated format and includes a system for synchronizing aggregated data over a back haul; and a head end system having a communication management system that receives and processes a synchronization message from the data aggregator received over the back haul, and wherein the head end system includes a metering system for requesting and obtaining meter data from the associated utility meters via the data aggregator.

DETAILED DESCRIPTION OF THE INVENTION

Various embodiments of the present invention are directed to transferring data between a communication module associated with a utility meter and the utility metering system (i.e., a head end system).

Technical effects of the various embodiments of the present invention include optimized bandwidth usage, accurate data quality representation, time-stamping of collected data, spontaneous communications including notification of exception conditions, seamless support for home area network constructs, and simplified meter group management. Additional technical effects includes the ability to present data to more than one head end system, subscription of selected subsets of data points from meter nodes, and rapid deployment of demand management controls to groups of meters.

Figure 1:
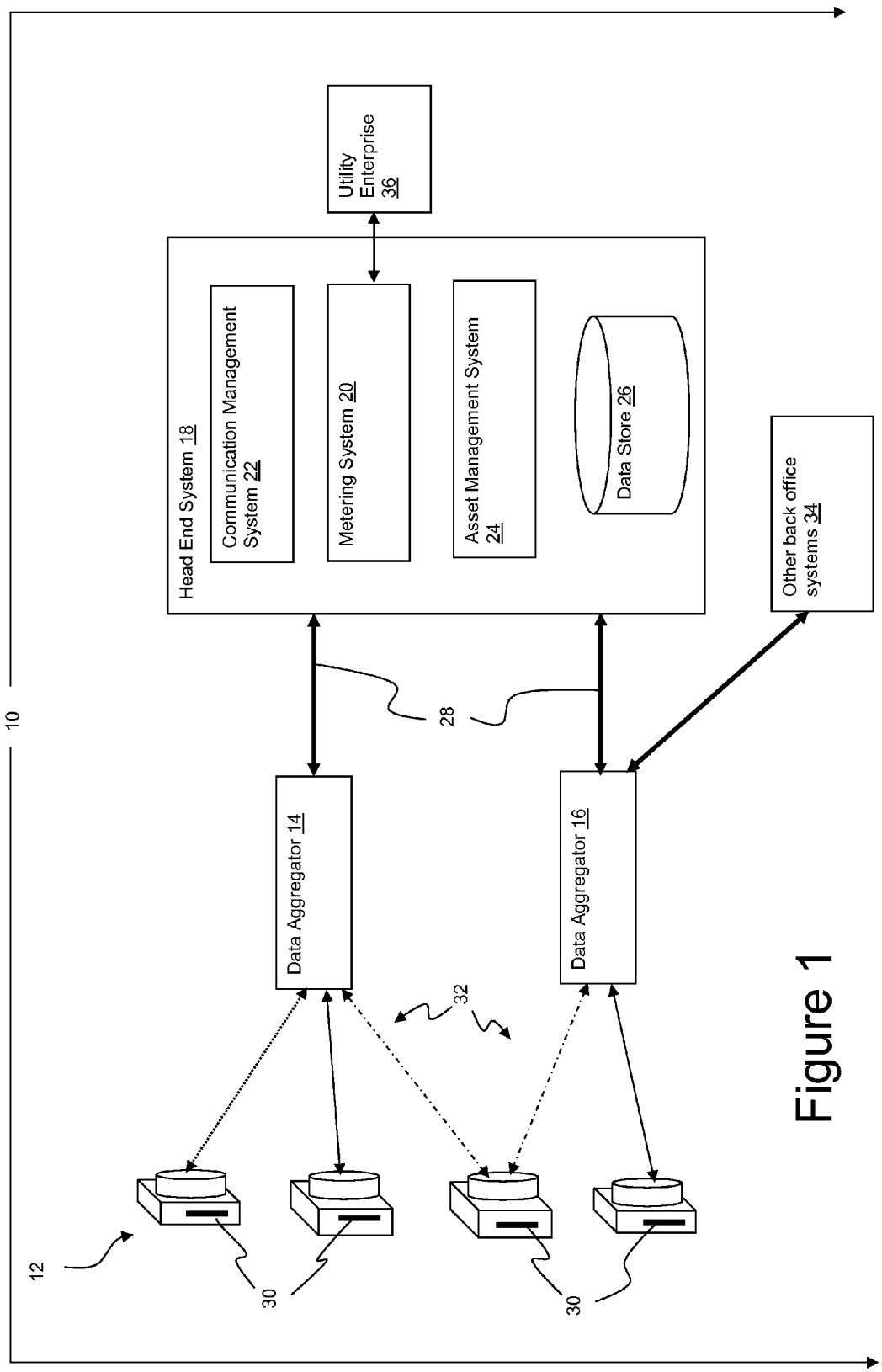
FIG. 1 is a schematic diagram illustrating an AMI system according to one embodiment of the present invention.

FIG. 1 depicts an illustrative embodiment of a fully realized advanced metering infrastructure (AMI) system 10. AMI system 10 includes a plurality of utility meters 12 that meter any type of utility, e.g., electric, gas, water, etc. Each utility meter 12 includes a communication module 30 that allows the individual meters 12 to communicate with one or more data aggregators 14, 16 using a messaging system including but not limited to a spontaneous messaging system. Spontaneous message based distributed information systems are commonly used in utility distribution industries (e.g., supervisory control and data acquisition "SCADA" systems), and various open standards exist such as DNP3 and IEC 61850. An illustrative implementation of a communication module 30 is described below in further detail with reference to FIG. 2. Note that while the illustrative embodiments describe the communication module 30 as a card, the features and functions of the communication module 30 could be integrated into a utility meter 12 in any manner, e.g., a mother board, an ASIC device, etc. Accordingly, for the purposes of this disclosure, the term communication module 30 (or card) refers to any combination of hardware, firmware and/or software that performs the associated functions described herein.

Data aggregators 14, 16 provide an intermediate node in AMI system 10 between utility meters 12 and head end system 18 (as well as other back office systems 34). Data aggregators 14, 16 collect and transmit data with utility meters 12 using data packets 32 that can be native to individual meters. In other words, while meters 12 are all spontaneously communicating, the data packaging formats, or protocols may differ from meter to meter. Illustrative meter data protocols include, e.g., C12.19, DLMS/COSEM, etc. Communication between the utility meters 12 and data aggregators 14, 16 may be implemented in any fashion, e.g., power line carrier, GPRS/GSM/3G/4G modems, wireless technology, including mesh networks, IP networks, etc. An illustrative implementation of a data aggregator 14, 16 is described below in further detail with reference to FIG. 3.

In a typical implementation, utility meters 12 reside at a home or business, data aggregators 14, 16 reside at a substation and head end system 18 resides at a back office operation. However, it is understood that the actual physical location of any of the elements of AMI system 10 can vary, e.g., data aggregator 14 may reside on a telephone pole, etc. A typical data aggregator 14, 16 may handle data from several thousand utility meters 12, depending on the amount and/or type of data being communicated. Accordingly, the number of data aggregators 14, 16 in a typical AMI system 10 will largely depend on the number of customers. In addition, it is understood that individual meters 12 may communicate with more than one data aggregator 14, 16 to, for instance, provide redundancy.

Each data aggregator 14, 16 communicates with one or more head end system 18 (and/or other back office systems 34) over a back haul communication channel 28 ("back haul") that is generally equipped to handle high bandwidth communications. Head end system 18 generally includes: (1) a metering system 20 that for example provides IEC 61968 compliant interfaces to a utility enterprise 36; (2) a communication management system 22 for collecting and transmitting data from/to data aggregators 14, 16; (3) a data store 26 for recording, managing and presenting data collected from utility meters 12; and (4) an asset management system 24 to automate provisioning, programming, and operation of assets such as utility meters 12. Asset management system 24 may interact with data aggretators 14, 16, and the communication management system 22 to automate provisioning of new meters on AMI system 10, and an example data flow is shown and described below with reference to FIG. 4.

Figure 2:
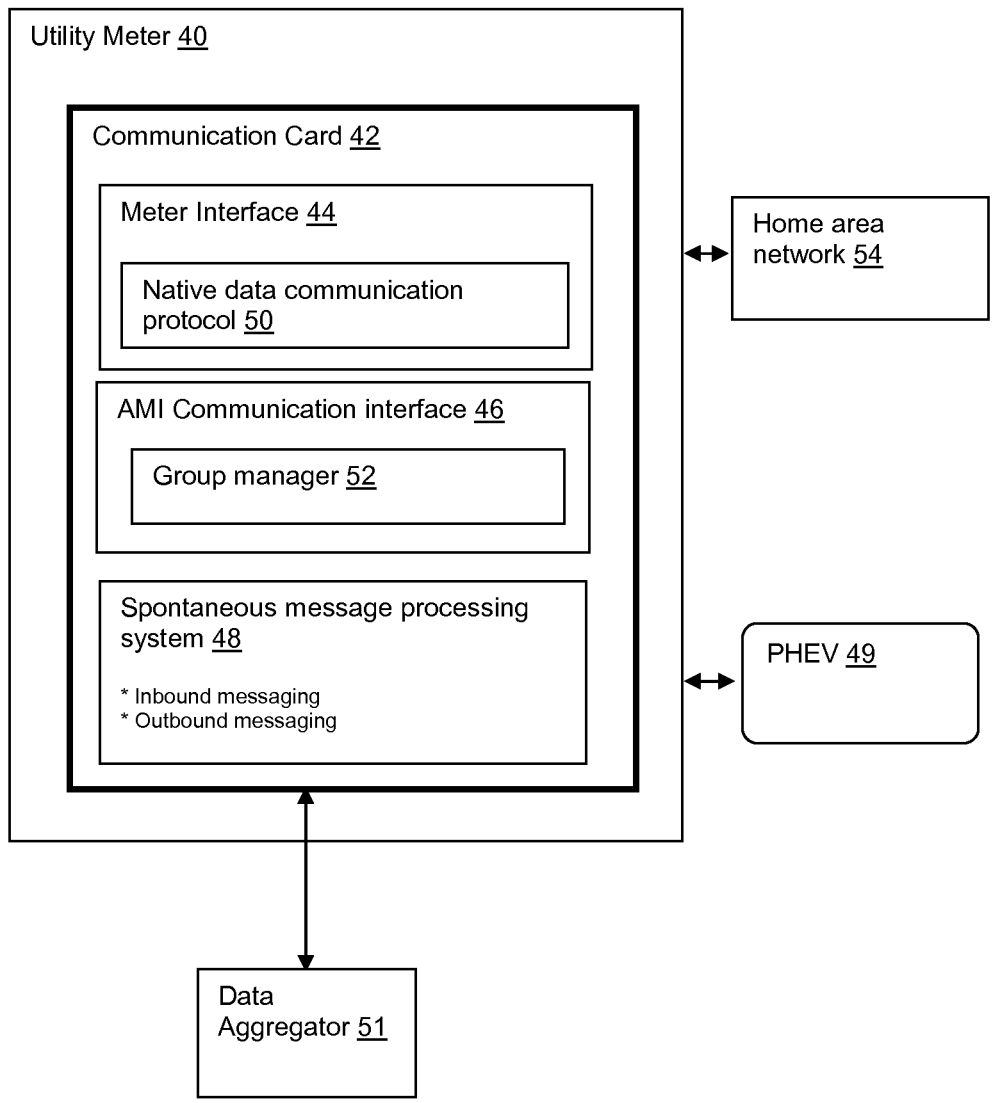
FIG. 2 is a schematic block diagram of a utility meter according to one embodiment of the present invention.

Referring to FIG. 2, an illustrative utility meter 40 is shown having a communication module implemented as a communication card 42. Communication card 42 generally includes a meter interface 44 for interfacing with utility meter 40, and accessing the metrology data either directly, or using a common meter communication standard, e.g., ANSI C12.18. As noted above, data may be inputted and outputted into utility meter 40 using a native data communication protocol 50 such as C12.19, DLMS/COSEM, etc. Also included is an AMI communication interface 46 for communication with one or more data aggregators 51. As noted, data can be communicated between utility meter 40 and data aggregators 51 in any fashion, e.g., power line carrier, modem, wireless, etc. In addition, communication card 42 may be adapted to interface with a home area network (HAN) 54 to provide and collect data to/from a local home or business network.

A group manager 52 on AMI communication interface 46 interacts with a data aggregator 51 to determine the communications behavior profile, including group memberships, of the utility meter 40. Group membership determines how outbound messages are generated, and how directives embedded in inbound messages are implemented. For instance, an inbound message may contain a Direct Load Control message targetting a particular group. If the meter belongs to the target group, it executes the Direct Load Control function; otherwise, the message is ignored.

Included in communication card 42 is a spontaneous message processing system 48 for generating and/or handling spontaneous inbound and outbound messages. Spontaneous outbound messages may for example include kilowatt-hour (KWH)/transmission operating unit (TOU) accumulation/demand data, e.g., collected according to a predefined schedule; detection of self-test failures; event data, e.g., detection of user configured exception conditions (e.g., a voltage level, a plug-in hybrid electric vehicle 49 (PHEV), a HAN security event, etc.), detection of meter tampering; detection that a local communication channel (e.g., an Opto Port) is activated; etc. As noted, although described in this embodiment as a spontaneous message processing system 48, it is understood that message processing could be implemented in a non-spontaneous manner, e.g., using batch processing, data communication at predetermined times, data polling, etc.

Illustrative inbound messages received by utility meter 40 may include: a service connection/disconnection request (in an individual addressed mode); a demand response message (in individual and broadcast modes); a PHEV 49 charging activate/deactivate command (in individual and broadcast modes); configuration and firmware updates (in individual and broadcast modes); etc.

Accordingly, in one illustrative embodiment, a power company may want to monitor and control activities associated with end users charging PHEVs 49. Accordingly, when a PHEV 49 is plugged in for charging, event data associated with this action can be spontaneously generated and reported back to the power company. In a further embodiment, the power company may want to oversee the charging of PHEVs 49. Accordingly, activation and deactivation data may be distributed to groups of meters in order to schedule charging activities to most effectively balance power usage on the electric distribution grid.

Figure 3:
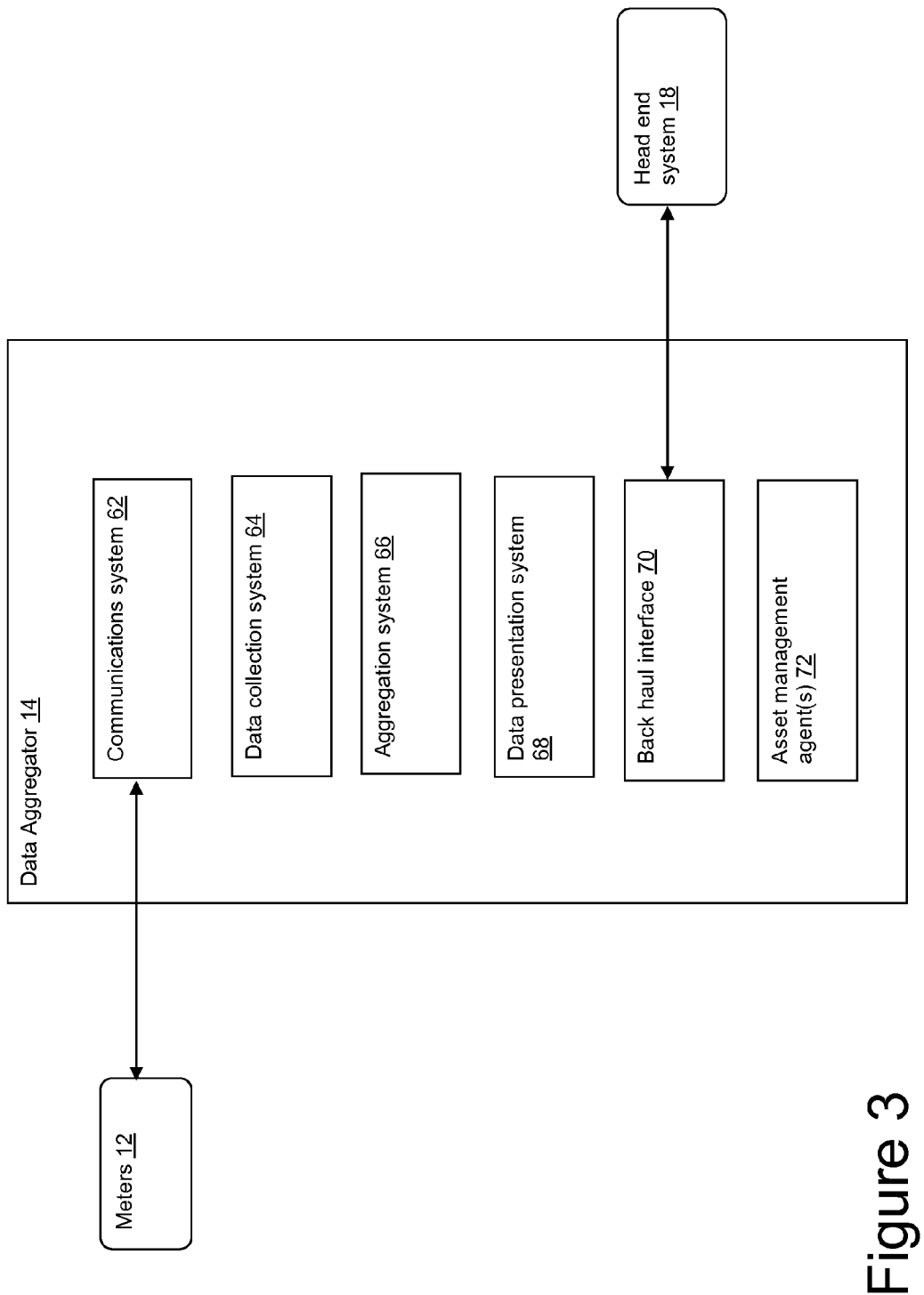
FIG. 3 shows a schematic diagram data aggregator according to one embodiment of the present invention.

Referring now to FIG. 3, an illustrative data aggregator 14 is shown. Data aggregator 14 generally includes: (1) a communications system 62 for providing a communication channel with a set of meters 12; (2) a data collection system 64 for collecting/interrogating data from the meters 12; (3) an aggregation system 66 for aggregating data collected from different meters (in different data formats) into aggregated data in a unified address space; (4) a data presentation system 68 for synchronizing the aggregated data over a back haul interface 70 to one or more head end systems 18; and an asset management agent 72.

Communications system 62 includes all the messaging facilities necessary to support solicited, unsolicited, and broadcast functions to communicate with meters 12. Accordingly, data aggregator 14 is able to address individual meters or broadcast to groups of meters. This can be accomplished in any manner, e.g., communicating using TCP/IP or any other communication protocol.

Within data aggregator 14, data collection system 64, asset management agents 72 and data presentation system 68 implement group management strategies such that meter grouping activity performed on the head end system 18 is disseminated to meters 12, and messages (e.g., behavior modification) targeting groups defined in the head end system 18 are expeditiously propagated to the constituent meters 12. Once groupings are implemented, data aggregator 14 can implement data transmission directives (e.g., public pricing messages), data collection directives (e.g., daily use data), or other directives from the head end system 18 as a broadcast or multicast signals that address a group of utility meters 12. Signals are generally transmitted to utility meters 12 without regard to their group membership.

Aggregation system 66 is responsible for managing spontaneous messages in an addressable memory space. Functions provided by aggregation system 66 include the ability to: group the controllable data points such that commanding a change to a single controllable data point affects a set of meters in a defined group; disseminate grouping information to the communication modules in a plurality of utility meters; and broadcast a message addressed to groups of utility meters such that all meters receive the message. In addition, various time stamp and status indications such as link strength, self-test and other status indicators can be easily stored and managed by aggregation system 66.

Data presentation system 68 exposes controllable data points such as those addressable in a group, or individual modes to the head end system 18 (or other remote hosts) via a back haul. Accordingly, the head end system 18 is synchronously updated with changes in data available at the data aggregator 14. Service disconnect/reconnect, critical peak pricing signal, direct load control, PHEV charging activate/deactivate are examples of controllable data points that may be exposed by the data presentation system 68. In addition, data presentation system 68 can expose data from HAN nodes attached to a meter 12 in its data set. The status of HAN nodes in the field can thus be reflected accurately and in a timely manner on the utility back office systems. This allows for a more accurate estimation of the affect of various demand response or load control (either directly, or as a pricing event) signals the utility may choose to generate. In addition, the data presentation system 68 can support a function whereby one or more head end systems 18 may subscribe to only a subset of the aggregated data available in the addressable memory space and the synchronous update would provide changes (e.g., value, quality or timestamp) to the subscribed subset only.

Asset management agents 72 are utilized to manage assets (e.g., meters) in AMI system 10 (FIG. 1). The asset management agents 72 interact with a remote asset management system 24 (FIG. 1) and other components of head end system 18 to implement a grouping function. The grouping function utilizes meter groupings defined by a metering system at head end system 18 to partition the actual meters on an AMI system 10 into one or more groups. Accordingly, a single meter may belong to a plurality of groups to facilitate rapid deployment of demand management control to groups of meters, providing dynamic meter group definitions, and providing firmware updates.

Figure 4:
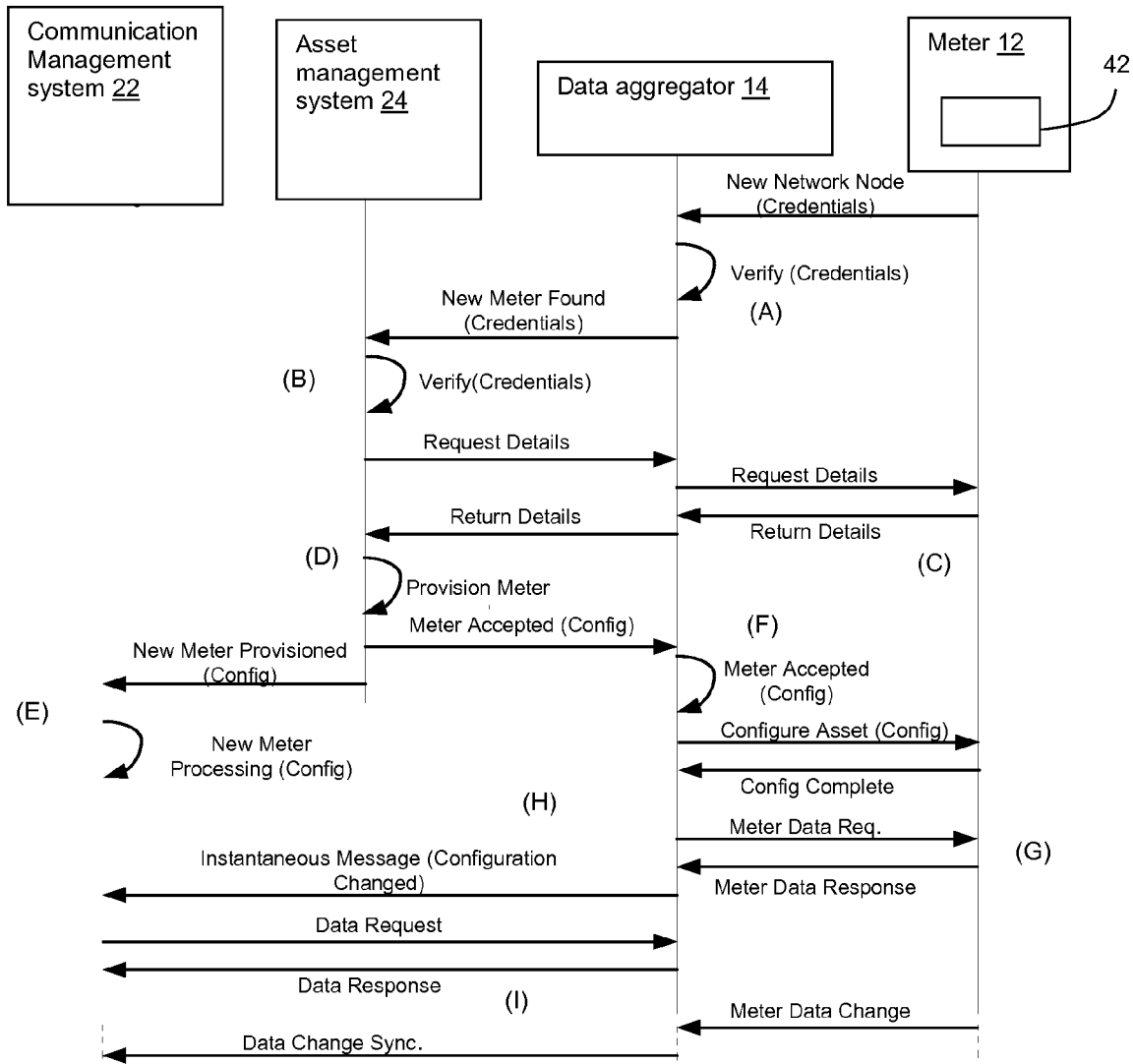
FIG. 4 shows a chart illustrating the implementation of meter provisioning system according to one embodiment of the present invention.

FIG. 4 depicts an illustrative sequence diagram of a meter provisioning process that depicts a meter 12 having a communication card 42, a data aggregator 14, an asset management system 24, and a communication management system 22. In this example, a new meter 12 is provisioned (i.e., placed into service). When this occurs, the meter's network node credentials are passed to, and verified by, an asset management agent 72 residing on the data aggregator 14 (A). Next, the data aggregator 14 passes the credentials of the newly found meter 12 to asset management system 24, which verifies the credentials and requests details (e.g., current settings, readings, locations, etc.) (B). Data aggregator 14 relays the request back to meter 12 and returns the details (C). The return details are then forwarded to asset management system 24, which then provisions meter 12 (D), i.e., activates it within the infrastructure. Asset management system 24 then forwards the meter details to the communication management system 22, which processes the information (E). Asset management system 24 also forwards the meter details back to data aggregator 14, which processes and stores the details, configures the asset and obtains a return configuration complete notification (F). This configuration may include the group assignment of the meter.

At any time thereafter, data aggregator 14 can issue a data request to meter 12 and obtain a response (G). Once the initial state of meter 12 is known to data aggregator 14 it will issue a spontaneous message back to the communication management system 22 (e.g., a configuration change occurred) (H), service a data request, and return a data response (I) to complete synchronization of the internal data representation.

In various embodiments of the present invention, aspects of the AMI system 10 described herein can be implemented in the form of an entirely hardware embodiment, an entirely software embodiment or an embodiment containing both hardware and software elements. In one embodiment, the processing functions performed by communication card 42 (FIG. 2); data aggregator 14 (FIG. 3); and head end 18 (FIG. 1) may be implemented in software, which includes but is not limited to firmware, resident software, microcode, etc.

Furthermore, the processing functions can take the form of a computer program product accessible from a computer-usable or computer-readable medium providing program code for use by or in connection with a computer or any instruction execution system (e.g., processing units). For the purposes of this description, a computer-usable or computer readable medium can be any computer readable storage medium that can contain or store the program for use by or in connection with the computer, instruction execution system, apparatus, or device. In a further embodiment, a computer readable transmission medium may be utilized that can communicate, propagate or transport the program for use by or in connection with the computer, instruction execution system, apparatus, or device.

The computer readable medium can be an electronic, magnetic, optical, electromagnetic, infrared, or semiconductor system (or apparatus or device). Examples of a computer-readable medium include a semiconductor or solid state memory, a random access memory (RAM), a read-only memory (ROM), a rigid magnetic disk and an optical disk. Current examples of optical disks include a compact disk—read only memory (CD-ROM), a compact disk—read/write (CD-R/W) and a digital video disc (DVD).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A data aggregator for use in an advanced metering infrastructure (AMI), comprising:
 a processor coupled to a memory;
 a communication system, executed by a processor, for communicating with a plurality of communication modules resident in a plurality of associated utility meters, wherein each communication module includes a group manager for determining a communications behavior profile based upon a group membership with a set of utility meters in a defined group, wherein the group membership determines how outbound messages are generated and how directives embedded in inbound messages are implemented;
 a data collection system, executed by the processor, for collecting messages from the plurality of communication modules;
 an aggregation system, executed by the processor, for managing messages as aggregated data in an addressable memory space, wherein the aggregation system includes:

a system for grouping controllable data points such that commanding a change to a single controllable data point affects the set of utility meters in the defined group;
a back haul interface, executed by the processor, for communicating via a back haul to a head end system; and
a data presentation system, executed by the processor, for transmitting aggregated data to a head end system via the back haul such that the head end system is synchronously updated with changes in data from the data aggregator.

2. The data aggregator of claim 1, wherein the messages are communicated spontaneously between the plurality of associated utility meters and the head end system.

3. The data aggregator of claim 1, wherein the messages include metrology data and status data.

4. The data aggregator of claim 1, wherein the aggregation system includes:
a system for disseminating grouping information to the plurality of communication modules in the plurality of associated utility meters; and
a system for broadcasting a message addressed to groups of utility meters such that all utility meters receive the message.

5. The data aggregator of claim 1, further comprising an asset management agent, wherein the asset management agent interacts with a remote asset management system to implement new utility meters.

6. The data aggregator of claim 5, wherein the asset management agent interacts with a remote asset management system to implement a grouping function to partition utility meters into groups.

7. A communication card for use with an associated utility meter in an advanced metering infrastructure (AMI), comprising:
a meter interface, executed by a processor, for communicating with the associated utility meter;
a communication interface, executed by the processor, for communicating data with a data aggregator;
a message processing system, executed by the processor, for managing inbound and outbound messages, including transmitting event data relating to charging a plug-in hybrid electric vehicle (PHEV); and
a group manager, executed by the processor, for determining a communications behavior profile based upon a group membership with a set of utility meters in a defined group, wherein the group membership determines how outbound messages are generated and how directives embedded in inbound messages are implemented.

8. The communication card of claim 7, wherein the message processing system further includes processing outbound messages selected from a group consisting of: accumulation/demand data; detection of event conditions; a home area network security event; detection of meter tampering; detection of a self-test failure; event data associated with activation of a local communication; and home area network node addition/removal.

9. The communication card of claim 7, wherein the message processing system further includes processing inbound messages selected from a group consisting of: a service connection/disconnection request; a demand response message; a plug-in hybrid electric vehicle (PHEV) charging activate or deactivate control signal; configuration data; and a firmware update.

10. An advanced metering infrastructure (AMI), comprising:
a plurality of communication modules, executed by a processor, incorporated into a plurality of associated utility meters, wherein each communication module includes a group manager for determining a communications behavior profile based upon a group membership with a set of utility meters in a defined group, wherein the group membership determines how outbound messages are generated and how directives embedded in inbound messages are implemented;
a data aggregator, executed by the processor, configured for communicating with each of the plurality of communication modules, wherein the data aggregator includes a system for translating meter specific data formats into an aggregated format and includes a system for synchronizing aggregated data over a back haul; and
a head end system, executed by the processor, having a communication management system that receives and processes a synchronization message from the data aggregator received over the back haul, and wherein the head end system includes a metering system for requesting and obtaining meter data from the associated utility meters via the data aggregator.

11. The AMI of claim 10, wherein each communication module includes:
a meter interface for communicating with one of the plurality of associated utility meters; and
a communication interface for exchanging data with the data aggregator.

12. The AMI of claim 11, wherein each communication module further includes:
a spontaneous message processing system for managing a spontaneous message; and
a group manager for selective enforcement of an inbound message addressed to an individual meter or a group of meters.

13. The AMI of claim 12, wherein the spontaneous message includes an outbound message selected from a group consisting of:
accumulation/demand data; a detection of an event condition; a home area network security event; a detection of meter tampering; a detection of self-test failure; a plug-in hybrid electric vehicle (PHEV) charging activate or deactivate monitoring event; and event data associated with activation of a local communication.

14. The AMI of clam 12, wherein a spontaneous message includes an inbound message selected from a group consisting of: a service connection/disconnection request; a demand response message; a plug-in hybrid electric vehicle (PHEV) charging activate and deactivate control signal; configuration data; and a firmware update.

15. The AMI of claim 10, wherein the data aggregator includes:
a communication system for communicating with the plurality of communication modules;
a data collection system for collecting at least one of metrology data and status data emanating as a spontaneous message from the plurality of communication modules;
an aggregation system for managing at least one of metrology data and status data as aggregated data in an addressable memory space;
a back haul interface for communicating via the back haul to the head end system; and
a data presentation system for spontaneously transmitting aggregated data to one or more head end systems via the back haul such that the head end system is synchronously updated with changes in data from the data aggregator.

16. The AMI of claim 15, wherein the addressable memory space is utilized to manage controllable data points for each of the plurality of utility meters.

17. The AMI of claim 10, wherein the head end system further comprises an asset management system and the data aggregator further comprises an asset management agent.

18. The AMI of claim 17, wherein the asset management system and the asset management agent control provisioning of a new utility meter.

19. The AMI of claim 10, wherein the head end system further comprises a data store for collecting, processing and presenting utility meter data.

20. The AMI of claim 10, wherein the head end system further comprises a system for issuing signals to individual utility meters and groups of utility meters.

* * * * *